F. F. GAINES.
FLUSH CAR DOOR.
APPLICATION FILED FEB. 6, 1911.

1,023,833.

Patented Apr. 23, 1912.

Witnesses:
Edgar T. Farmer
G. A. Pennington

Inventor:
Frederick F. Gaines,
By Carr & Carr, attys.

F. F. GAINES.
FLUSH CAR DOOR.
APPLICATION FILED FEB. 6, 1911.

1,023,833.

Patented Apr. 23, 1912.
7 SHEETS—SHEET 7.

Witnesses:
Edgar T. Farmer
G. A. Pennington

Inventor:
Frederick F. Gaines,
By Cam & Cam Attys.

UNITED STATES PATENT OFFICE.

FREDERICK F. GAINES, OF SAVANNAH, GEORGIA.

FLUSH CAR-DOOR.

1,023,833.   Specification of Letters Patent.   Patented Apr. 23, 1912.

Application filed February 6, 1911. Serial No. 606,762.

*To all whom it may concern:*

Be it known that I, FREDERICK F. GAINES, a citizen of the United States, and a resident of the city of Savannah, in the county of Chatham and State of Georgia, have invented a new and useful Improvement in Flush Car-Doors, of which the following is a specification.

This invention relates to car doors and more particularly to flush doors for freight cars.

It has for its principal objects to obtain the advantages of a flush door and to eliminate the mechanical and structural drawbacks and disadvantages of the flush doors heretofore in general use.

The type of flush door most generally used requires special upper and lower brackets and trackways and a cam-operated guide at the back edge to throw the door in flush. The bottom guide or trackway is liable to be damaged by the wheels of drays, trucks, etc., backing up to the cars, making the doors entirely inoperative, or, under slighter blows, very hard to operate.

One of the objects of this invention, therefore, is to dispense with the lower track way.

Other objects and advantages will hereinafter more fully appear.

The invention consists in the parts and in the arrangements and combinations of parts hereinafter described and claimed.

In the accompanying drawings which form part of this specification and wherein like symbols refer to like parts wherever they occur.

Figures 4, 5:
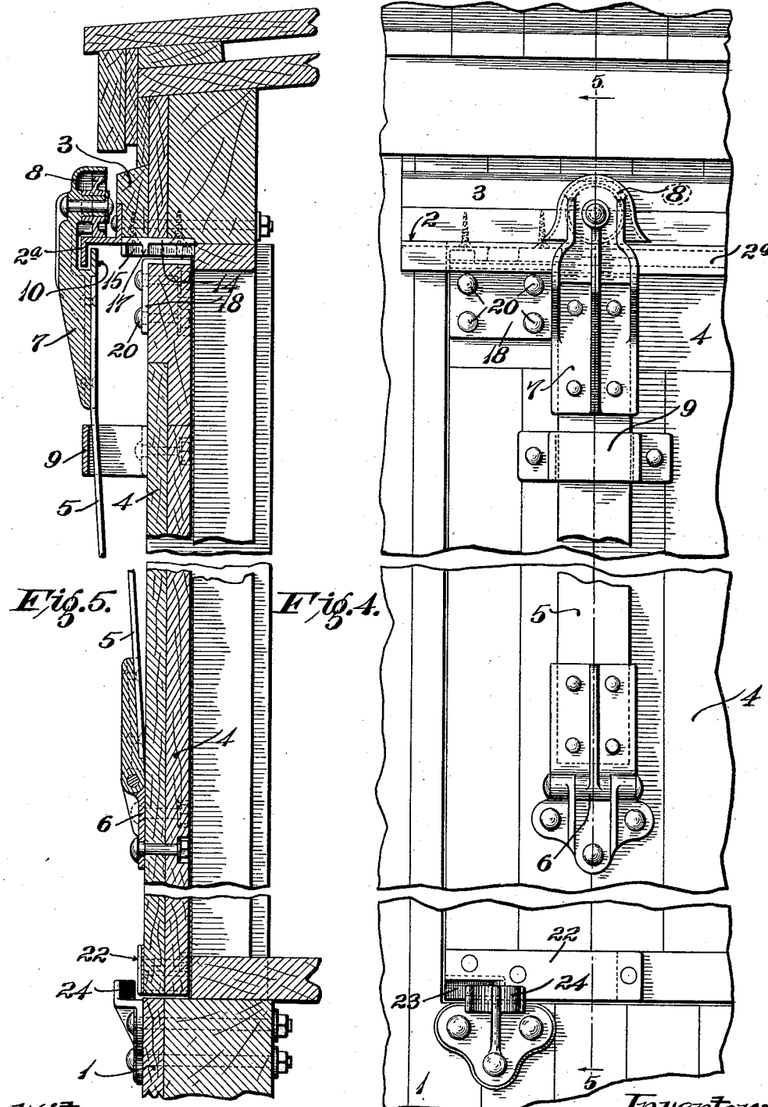
Fig. 4 is a fragmentary side elevation adjacent to the front edge of the door.
Fig. 5 is a section on the line 5—5 of Fig. 4.

In the drawings, the body portion of an ordinary freight car 1 is shown. As illustrated throughout the drawings, with the exception of Figs. 6 and 7, a trackway 2 is secured to the side of the car above the door opening. Preferably, the trackway 2 comprises a Z-bar which is secured to a wooden rail strip 3. The combined width of the rail strip 3 and horizontal middle portion of the Z-bar 2 is such that sufficient space is provided between the downturned flange 2ᵃ of the Z-bar and side of the car to permit the upper edge of the door to fit loosely therebetween. The door 4 is provided with hangers comprising elongated bars, plates or straps 5 which are hinged or pivoted at their lower ends to brackets 6 which are in turn secured to the outer face of the door. On the upper ends of the hanger bars or straps 5 are members 7 in which are journaled antifriction rollers 8 adapted to run on the horizontal portion of the trackway 2. Guiding and retaining loops or yokes 9 are placed over the hanger bars or straps 5 and secured at their opposite ends to the outer face of the door. The members 9 may be made of metal plates bent into shape, or of castings, as desirable. The height of the outwardly bowed intermediate portions of the respective loops or members 9 is such that sufficient play is allowed to permit the door to be swung into the door opening so as to be flush with the side of the car, as shown more clearly in Fig. 5 of the drawings. The hanger members 7 on which the rollers 8 are journaled are provided with projections 10 adapted to fit behind the flange 2ª of the trackway 2 to retain the hangers thereon. Preferably the members 5 are hinged to the door approximately at or just above the middle thereof.

Secured to the side of the car adjacent to the lower edge of the door opening are guiding and retaining brackets 11. These brackets may be of the usual type and are provided to prevent the bottom edge of the door from swinging too far away from the side of the car when the door is moved out from its flush position, sufficient play being allowed to permit the door to be readily moved to its full opened position. Suitable back stops 12 are provided on the side of the car to arrest the door at the end of its full open movement. The lower of the two stops is preferably provided with a portion 13 adapted to overlap the rear edge portion of the door so as to retain the door against outward movement.

Secured to the under face of the lintel of the doorway is a cam plate 14. This cam plate is provided with a diagonal cam groove 15 formed preferably by parallel flanges or lugs 16; and the flanges are arranged so that one end of each flange extends to the edge of the plate and the adjacent end of the opposite flange terminates short of the particular edge portion and is preferably extended parallel with the same as at 17.

Secured to the top edge portion of the door is a lug plate 18. Preferably this plate 18 is angular in cross section so as to have a portion adapted to rest on the top edge of the door and a downturned portion which is perforated as at 19 to receive suitable securing bolts 20. Preferably the perforations 19 are square so as to receive the squared headed end portions of carriage bolts which are secured by nuts on their inner ends.

Figure 16:
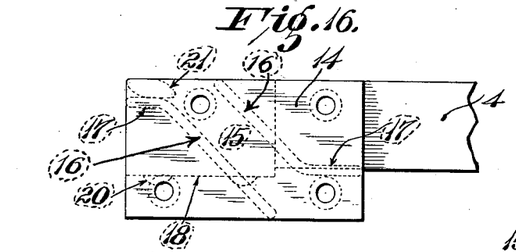
Fig. 16 is a plan view of the top cam plate with which the front edge portion of the door coöperates, the door being shown in closed position.
Figure 17:
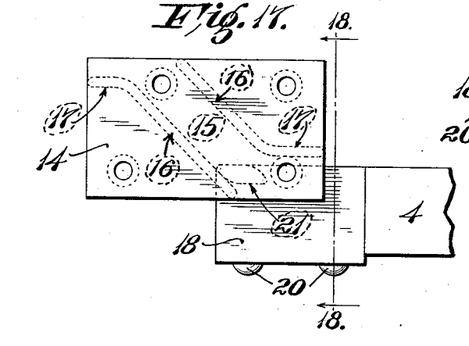
Fig. 17 is a view similar to Fig. 16, showing the door moved out of flush position.
Figure 18:
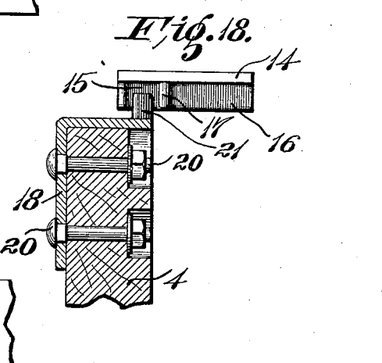
Fig. 18 is a section on the line 18—18 of Fig. 17.
Figure 19:
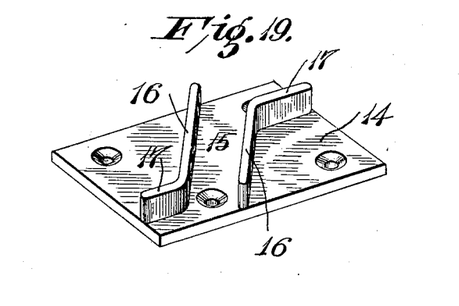
Fig. 19 is an inverted perspective view of the top cam plate.
Figure 20:
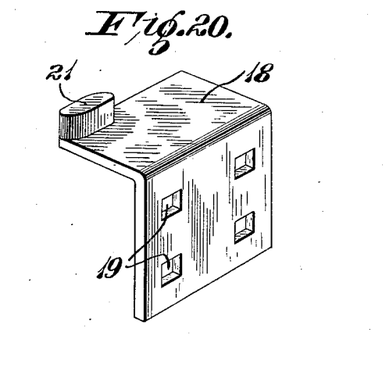
Fig. 20 is a perspective view of the lug plate for the door which coöperates with the upper cam plate.

On the horizontal flange of the plate 18 is a lug 21 whose opposite end portions are beveled to correspond with the angle of the diagonal groove or guideway 15 on the plate 14, so that said lug 21 when brought endwise into contact with the guide flange 16, as shown more clearly in Fig. 17, is deflected diagonally through the guideway 15 and behind the portion 17 of the guide flange, as more clearly shown in Fig. 16, when the door is moved into closed position. By this arrangement, the upper corner portion of the door is drawn in to the door opening flush with the side of the car. When the door is moved into open position the lug 21 engages the opposite guide flange 16, whereby the corner portion of the door is thrown outwardly.

Secured on the lower front corner of the door is a casting or member 22 comprising a plate portion which is bolted to the outer face of the door. On the outer end of the plate 22 is a beveled cam portion 23 which is fitted into a cut-out portion at the corner of the door. Secured to the side of the car, at the bottom of the door opening, is a bracket having a guide lug 24 adapted to coöperate with said beveled cam 23 on the door, so that the lower corner of the door is deflected into the door opening flush with the side of the car when the door is closed.

Figure 1:
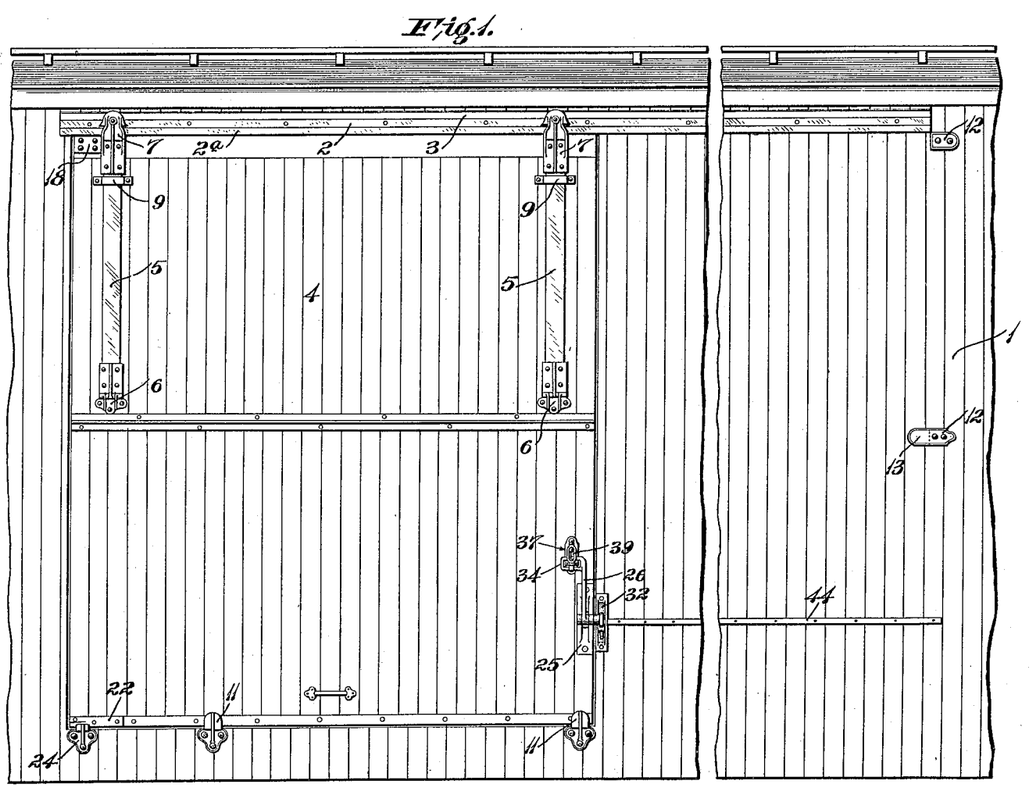
—Figure 1 is a fragmentary side elevation of a portion of a freight car adjacent to the door opening, the door being shown in closed position.
Figures 2, 3:
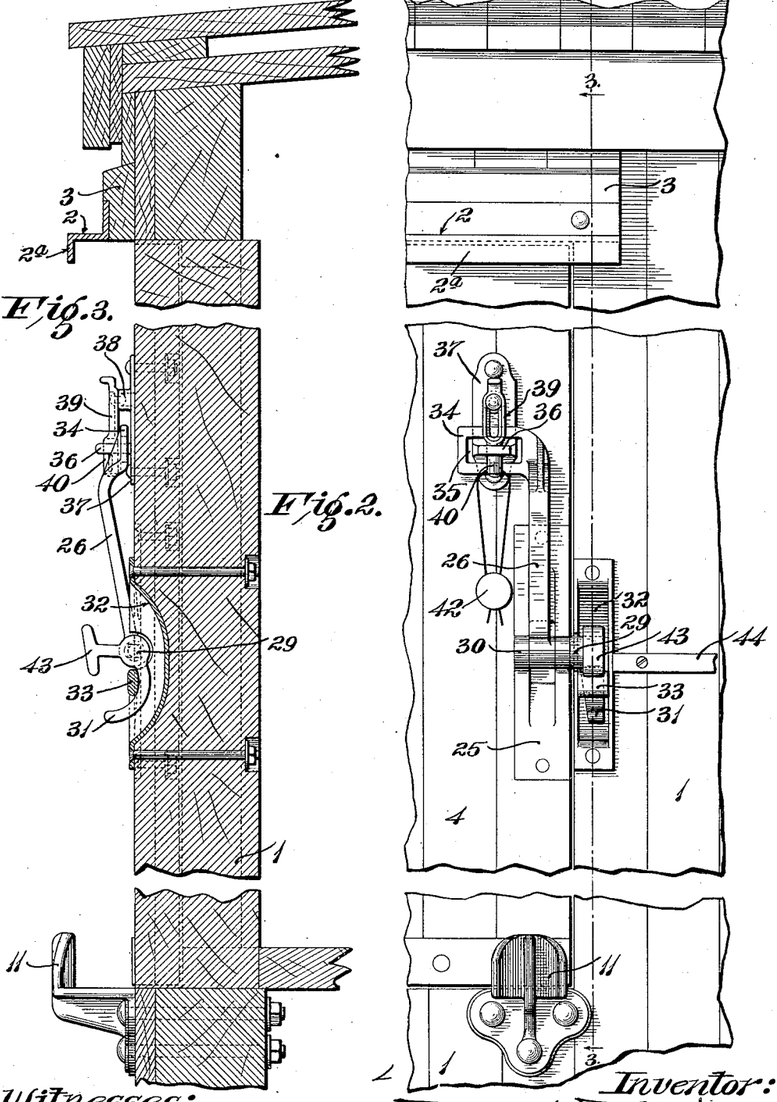
Fig. 2 is a fragmentary side elevation of the portion of the car adjacent to the rear edge of the door when in closed position.
Fig. 3 is a section on the line 3—3 of Fig. 2.
Figures 11, 12, 13, 14, 15:
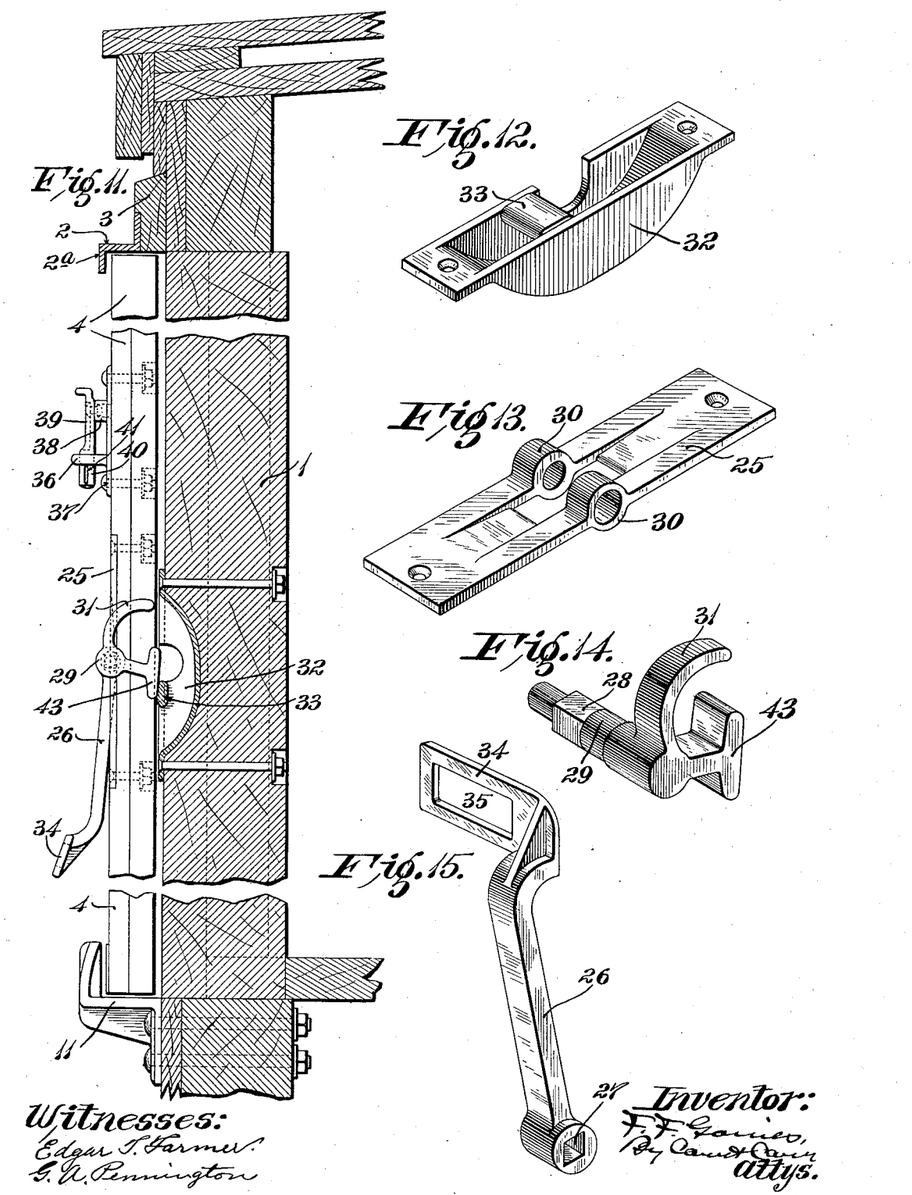
Fig. 11 is a section similar to Fig. 3, the door being moved out of its flush position.
Fig. 12 is a detail view of the keeper which coöperates with the door-locking lever.
Fig. 13 is a view of the supporting plate for the door-locking lever.
Fig. 14 is a detail view of the hooked member of the door-locking lever.
Fig. 15 is a detail view of the door-locking lever.

Secured on the outer face of the door, at the rear edge portion and near the bottom edge thereof, is a bracket or bearing plate 25 in which is pivoted a locking lever 26. This locking lever, as more clearly shown in Fig. 15, is preferably provided with a squared opening 27 adapted to receive a squared portion 28 of the horizontal pivot stud 29 which is journaled in the bearing 30 on the plate or bracket 25. On the end of the pivot stud is a cam hook 31 which is adapted to enter a countersunk pocketed keeper 32. The keeper 32 is provided with a transverse bar 33 across its opening in position to be engaged by said cam hook, whereby, when the lever 26 is raised to the position shown more clearly in Figs. 1, 2 and 3, the rear edge portion of the door is forced into the door opening flush with the side of the car.

The free end portion of the locking lever 26 is provided with an angular extension or lug 34 which is slotted as at 35 so as to fit over a horizontal lug 36 projecting outwardly from a retaining plate 37 secured to the outer face of the door. Pivotally and slidably mounted on a lug 38 projecting outwardly from the plate 37, is a bolt 39 whose end portion 40 is adaped to drop through a perforation in said lug 36 on the retaining plate 37 so as to secure the locking lever in its locking position. The end portion 40 of the bolt 39 is provided with a transverse opening 41 to receive the band or wire loop of an ordinary car door seal 42.

The portion of the pivot stud 29 to which the cam hook 31 is attached is also provided with a lug or shoe 43 adapted to bear against the outer face of the cross bar 33 of the keeper 32 when the locking lever 26 is moved downward into the position shown in Fig. 11, whereby the rear edge portion of the door is held from the door opening so as to clear the side of the car. In this position of the parts, the door may be moved rearwardly into open position, the front edge portion being guided outwardly from the door opening by the coöperating cams and projections provided at the upper and lower corners of the door and doorway, as above set forth. A wear-strip 44 is preferably provided along the side of the car for the shoe 43 to bear against when the door is moved into opened and closed position.

The hook portion 31 of the locking lever 26 is of such length that the lever has to move through a considerable angle before the hook is free from the keeper 32. Hence, an ordinary sealing band or wire (in practice generally about ten inches long) may be used, and the bolt 39 may be withdrawn from the lug 36 on the retaining bracket 37 and yet the lever, although permitted considerable movement, will not withdraw the hook portion 31 entirely from the keeper 32. Nor will the edge of the door be moved entirely free from the door opening. Consequently, the door cannot be opened without breaking the seal.

Figures 6, 7:
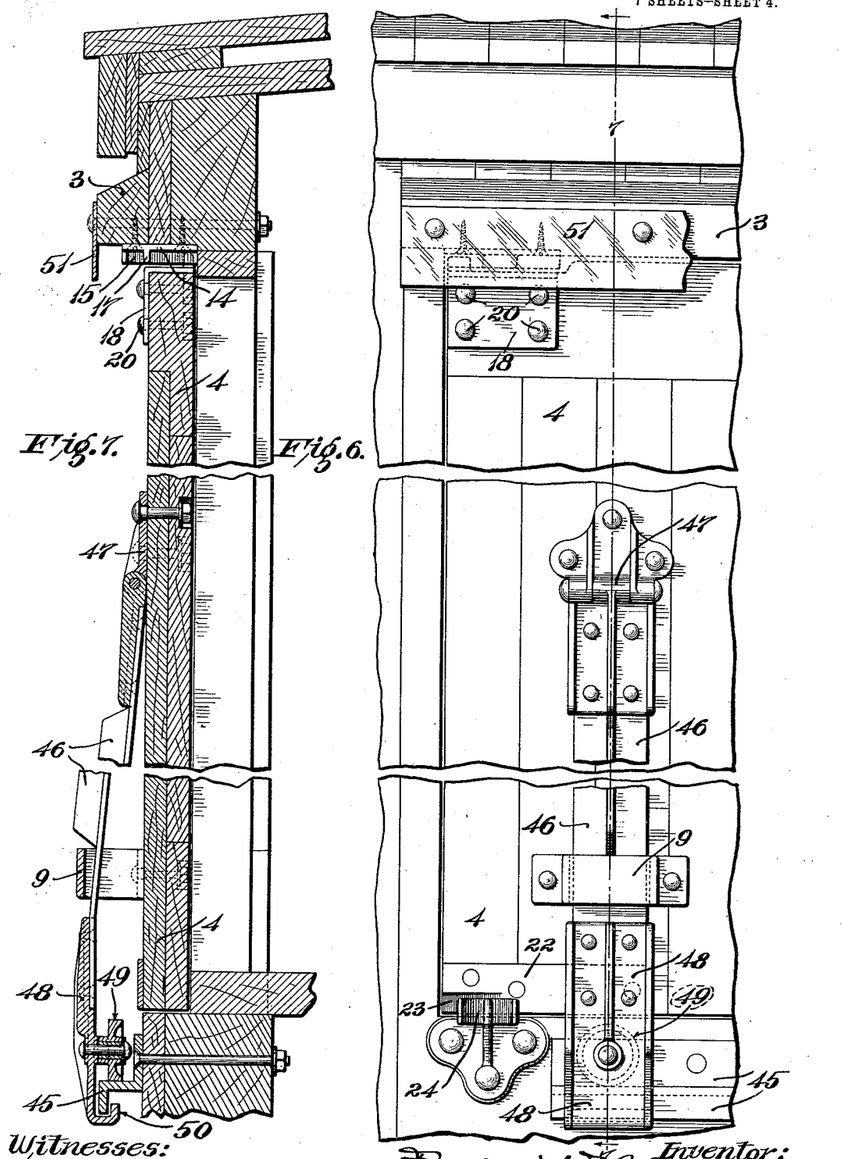
Fig. 6 is a view similar to Fig. 4 showing a modified arrangement of the door carrier.
Fig. 7 is a section on the line 7—7 of Fig. 6.
Figure 8:
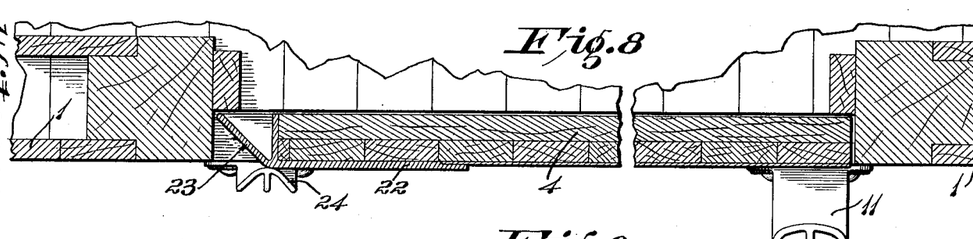
Fig. 8 is a horizontal section through the door and door posts, the door being shown in closed position.
Figure 9:
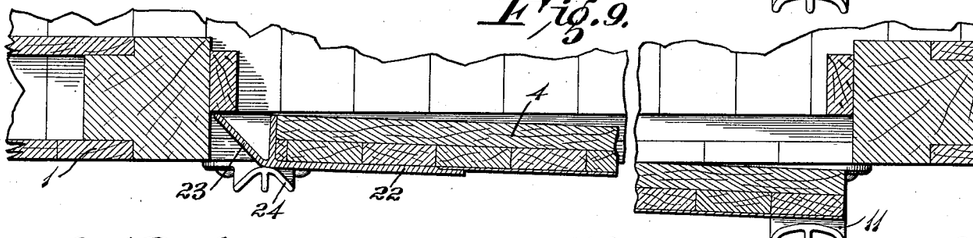
Fig. 9 is a view similar to Fig. 8 showing the door in position just prior to being thrown in flush with the side of the car or to being moved into opened position.
Figure 10:
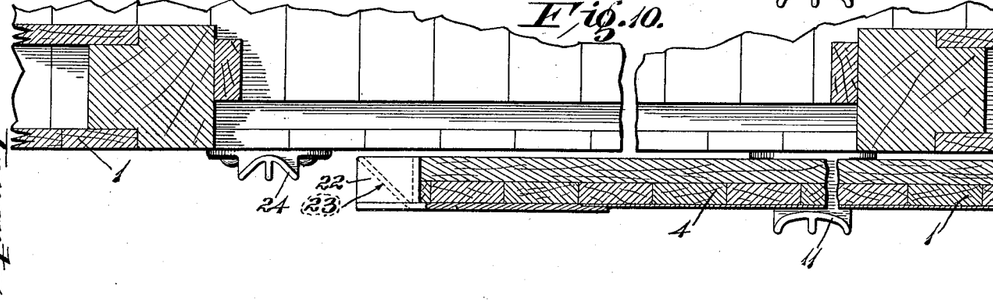
Fig. 10 is a view similar to Figs. 8 and 9 showing the door in partially opened position.

While it is preferable to suspend the door from the trackway above the door opening, obviously the trackway may be located below the door opening, as shown in Figs. 6 and 7 of the drawings. In this case, the trackway 45 comprises a Z-bar which is bolted to the outer face of the car. The carriers for the door comprise members 46 preferably of angle iron section, either channels, or, as shown, T-sections. The upper end portions of the members 46 are hinged to the door approximately at the middle or above or below the middle, as desirable. The hinges 47 are similar to the hinges 6 in the construction where the door is hung from the upper trackway. On the lower ends of the members 46 are brackets 48 on which are journaled bearing rollers 49 adapted to travel on the trackway 45. The brackets 48 are provided with retaining portions 50 to prevent the rollers from slipping sidewise off the trackway 45. In this modification, also, a strip 51 is secured to the wooden rail strip 3 above the door opening to guide and retain the upper edge of the door and also serve as a watershed. In other respects the door is arranged as described in connection with the arrangement for the top trackway.

Obviously, the device admits of considerable modification without departing from my invention. Therefore, I do not wish to be limited to the specific construction and arrangement shown.

What I claim is:

1. The combination with the side of a car having a door opening therein, of a door adapted to be moved into the door opening flush with the side of the car, a keeper on the side of the car adjacent to the door opening, a locking lever mounted on the end portion of the door, said locking lever having an eccentric hook at its pivot end adapted to engage said keeper so as to effect the movement of the door into the door opening when the locking lever is moved in one direction, said eccentric hook being also adapted to bear against the keeper to move the door outward when the locking lever is moved in the reverse direction, and a lateral projection on said lever separate from said eccentric hook but correlated therewith and adapted to coöperate with the outer face of the lever-engaging portion of the keeper to effect the movement of the door out of the door opening when the lever is moved in said reverse direction.

2. The combination with the side of a car having a door opening therein, of a door adapted to be moved into the door opening flush with the side of the car, a keeper embedded in the side of the car and having a lever-engaging portion substantially flush with the side of the car, and a locking lever pivoted on said door and having a keeper-engaging portion adapted to pull the door into the door opening when it is moved into one of its positions and being also adapted to move the door outward when it is moved to its reverse position, said lever having a separate member in coöperative relation to said keeper-engaging portion and adapted to bear against the outer face of said lever-engaging portion of the keeper when the lever is moved to said reverse position to effect the withdrawal of the door from the door opening.

3. In a flush car door, the combination with a car door adapted to be moved into the door opening flush with the side of the car, of guide devices on the car adjacent to one side of the door opening at the top and bottom respectively, means on the end portion of the door adapted to engage said guide devices whereby that end portion of the door is moved into and out of the door opening as the door is respectively moved into and out of closed position, a recessed keeper countersunk into the side of the car adjacent to the opposite side of the door opening, said keeper having a horizontal bar across its opening substantially flush with the side of the car, a locking lever pivoted horizontally on the adjacent end portion of the door, said locking lever having an eccentric hooked portion adapted to engage the inner face of the cross bar of said keeper whereby that end portion of the door is moved into the door opening when the lever is moved in one direction, said hooked portion being adapted to bear against the bottom of the keeper to move the door outward when said lever is moved reversely, and a lateral projection on said locking lever having a shoe at its end adapted to bear against the outer face of said bar on the keeper so as to move that end of the door out of the door opening and the hooked portion of the lever free from the keeper.

4. The combination with the side of a car having a door opening therein, and a door adapted to be moved into the door opening substantially flush with the side of the car, of a recessed keeper countersunk into the side of the car adjacent to the side of the door opening, said keeper having a horizontal bar across its opening, a locking lever pivoted horizontally on the end of the door and having an eccentric hooked portion adapted to engage the inner face of the cross bar whereby the door is moved into the door opening when the lever is moved in one direction and also adapted to bear against the bottom of the keeper to move the door outwardly when the lever is moved reversely, said lever also having a laterally projecting shoe adapted to bear against the outer face of said cross bar when the lever is moved in said reverse direction whereby the door is moved out of the door opening and the hooked portion of the lever is moved free of the keeper, substantially as described.

Signed at Savannah, Georgia, this 27th day of Jan. 1911.

FREDERICK F. GAINES.

Witnesses:
J. G. KELLAM,
J. R. KOERPER.

Copies of this patent may be obtained for five cents each, by addressing the "Commissioner of Patents, Washington, D. C."